United States Patent [19]

Pinnau et al.

[11] Patent Number: 5,538,535
[45] Date of Patent: Jul. 23, 1996

[54] MEMBRANE PROCESS FOR TREATMENT OF CHLORINE-CONTAINING GAS STREAMS

[75] Inventors: Ingo Pinnau, Palo Alto; Kaaeid A. Lokhandwala, Menlo Park; Phuong Nguyen, Fremont; Lora G. Toy, San Francisco; Marc L. Jacobs, Berkeley, all of Calif.

[73] Assignee: Membrane Technology and Research, Inc., Menlo Park, Calif.

[21] Appl. No.: 395,046

[22] Filed: Feb. 27, 1995

[51] Int. Cl.$^6$ ............................................. B01D 53/22
[52] U.S. Cl. ......................... 95/41; 95/42; 95/48; 95/117; 95/230
[58] Field of Search ..................... 95/39, 41, 42, 95/45, 48, 90, 116, 149, 230

[56] References Cited

U.S. PATENT DOCUMENTS

| | | | |
|---|---|---|---|
| 3,651,618 | 3/1972 | Klein et al. | 95/45 X |
| 3,972,691 | 8/1976 | Fukushima et al. | 95/39 |
| 4,130,403 | 12/1978 | Cooley et al. | 55/16 |
| 4,180,552 | 12/1979 | Graham et al. | 423/359 |
| 4,180,553 | 12/1979 | Null et al. | 423/359 |
| 4,230,463 | 10/1980 | Henis et al. | 55/16 |
| 4,243,701 | 1/1981 | Riley et al. | 427/244 |
| 4,302,336 | 11/1981 | Kawaguchi et al. | 210/654 |
| 4,424,067 | 1/1984 | Tarasenko et al. | 95/48 |
| 4,553,983 | 11/1985 | Baker | 55/16 |
| 4,654,063 | 3/1987 | Auvil et al. | 62/18 |
| 4,661,254 | 4/1987 | Zupancic et al. | 210/490 |
| 4,906,256 | 3/1990 | Baker et al. | 55/16 |
| 4,913,816 | 4/1990 | Waite et al. | 210/490 |
| 4,941,972 | 7/1990 | Kau et al. | 210/490 |
| 5,013,448 | 5/1991 | Swamikannu | 210/642 |
| 5,064,447 | 11/1991 | Lee | 95/41 X |
| 5,071,451 | 12/1991 | Wijmans | 55/16 |
| 5,256,295 | 10/1993 | Baker et al. | 210/640 |
| 5,256,296 | 10/1993 | Baker et al. | 210/640 |
| 5,344,702 | 9/1994 | Haubs et al. | 428/305.5 |
| 5,376,164 | 12/1994 | Zarchy et al. | 95/41 |
| 5,389,126 | 2/1995 | Baker et al. | 95/45 |
| 5,415,681 | 5/1995 | Baker | 95/45 |

OTHER PUBLICATIONS

Hardy et al., "A Personal Chlorine Monitor Utilizing Permeation Sampling," Environ. Sci.& Tech. Sep., 1979.

W. J. Ward et al., "Ultrathin Silicone/Polycarbonate Membranes for Gas Separation Processes," Jour. Memb. Sci. (1), 1976.

S. S. Kremen, "Technology and Engineering of ROGA Spiral-Wound Reverse . . . " in Reverse Osmosis and Synthetic Membranes, S.Sourirajan,Ed., 1977.

*Primary Examiner*—Robert Spitzer
*Attorney, Agent, or Firm*—J. Farrant

[57] ABSTRACT

A membrane process for separating chlorine from chlorine-containing gas streams is disclosed. The process employs a permselective membrane that is selective to chlorine and is stable in the long-term presence of chlorine. The process can be used to treat tail-gas from chlor-alkali plants, for example.

47 Claims, 9 Drawing Sheets

MEMBRANE PROCESS FOR TREATMENT OF CHLORINE-CONTAINING GAS STREAMS

This invention was made in part with Government support under SBIR Contract Number 68D30106, awarded by the Environmental Protection Agency. The Government has certain rights in this invention.

FIELD OF THE INVENTION

The invention relates to membrane-based gas separations, specifically, to the removal and recovery of chlorine from chlorine-containing gas streams.

BACKGROUND OF THE INVENTION

Chlorine ranks among the ten most important commodity chemicals produced worldwide. The total production of chlorine in the United States in 1991 was reported to be about 14 million tons, almost all of which was produced by the electrolysis of brine. The product of electrolysis is chlorine gas, contaminated with water, hydrogen, air, and other impurities. After the removal of water and other impurities, most chlorine is liquefied by compression and chilling, then sold. As with all compression/condensation processes, it is difficult to recover all the condensable chlorine gas without going to extreme conditions of temperature and pressure. It is not unusual, therefore, for the tail gas from the liquefaction process to contain as much as 40% chlorine.

The presence of hydrogen in the gas stream is an added complication. When hydrogen is present in a gas stream with chlorine or with oxygen at hydrogen concentration less than about 4%, dependent upon pressure and temperature, usually the stream is non-explosive. However, as the hydrogen concentration increases above this lower explosive limit, the reaction on ignition becomes more violent and eventually may reach the detonation stage. To avoid this, the gas stream is routinely diluted with enough air or nitrogen to keep the hydrogen concentration below the 4% limit. Typically such additions are made after condensation steps, wherein the condensable components are removed, leaving a higher concentration of hydrogen in the vent stream.

For the past forty years, the tail gas has been treated by absorption in carbon tetrachloride. Tail gas from chlorine liquefaction, and other waste streams ("sniff gas") from the plant, are supplied to the carbon tetrachloride absorber under pressure. Chlorine-free (~1 ppm) gas is vented to the atmosphere. The chlorine-rich carbon tetrachloride is fed to a stripper, where chlorine is desorbed and sent to the liquefaction system. The stripped solvent is pumped back to the absorption tower.

Approximately 30 lb of carbon tetrachloride per ton of recovered chlorine are lost in this process. It is estimated that 9 million lb of carbon tetrachloride are emitted annually by chlorine liquefaction tail-gas treatment plants. Additional emissions remit from similar chlorine absorption processes used in the paper, textile, and polyvinyl chloride industries. Because of the high ozone-depletion potential of carbon tetrachloride, the U.S. Environmental Protection Agency has mandated that these emissions be eliminated, and carbon tetrachloride production will cease after 1995. There is an urgent need, therefore, for alternative treatment technology.

A number of metals are also produced by the electrolysis of their molten chlorides, for example, magnesium, calcium, beryllium, and sodium. In all cases, chlorine-containing gas is liberated at the cell anodes; in magnesium production, the gas may contain as much as 90% chlorine. Other processes that require removal or recovery of chlorine from gas streams include, but are not limited to: production of chlorinated chemicals, bleaching, refrigeration and heat transfer fluids, chlorine transfer and clean-up operations, ore beneficiation, and wastewater treatment.

Gas separation by means of membranes is known. For example, U.S. Pat. No. 4,230,463, to Henis and Tripodi, describes multicomponent membranes for separating oxygen from air. U.S. Pat. Nos. 4,180,552, to Graham and MacLean, 4,180,553, to Null and Perry, and 4,654,063, to Auvil and Agrawal, describe membrane processes for separating hydrogen from various gas streams. Separation of carbon dioxide from natural gas is taught in U.S. Pat No. 4,130,403, to Cooley and Coady. U.S. Pat. No. 4,553,983, to Baker, describes methods for removing organic vapor from air, using highly organic-selective membranes.

Many of these membranes and membrane processes have been in use for 10–15 years in various commercial applications. However, to date, membranes have not been used for the separation of chlorine from other gases, probably because of the known or expected extreme reactivity of chlorine gas with many of the polymers typically used in making membranes. In fact, the inventors are not aware of any permeability data on chlorine separation. Until now, it was not known whether a membrane could be made that would be selective for chlorine over other gases. In addition, chlorine is highly corrosive to many of the materials often used in building membrane systems—aluminum, polyvinyl chloride (PVC), silicones, epoxies, and so on. With the exception of steel, which is the commonly-used material for containers for storage or transport of liquid chlorine, many materials that are in everyday, general use in membrane separation systems have very limited resistance to chlorine gas or liquid.

The difficulties encountered when operating polymer membranes in the presence of chlorine are exemplified by the reverse osmosis (RO) industry. Various membranes made from cellulose acetates, polyamides, and polyetherureas, among others, are used for commercial RO applications; the industry has experimented with many more. Most membranes, commercial or developmental, have moderate-to-limited-to-nil resistance to the chlorine used as a pretreatment to kill microorganisms that would otherwise foul the membrane surface. After chlorine treatment, the feedstream must be dechlorinated prior to membrane contact, a costly addition to the overall treatment process. Thus, since the beginnings of the RO industry, the membrane community has been involved in an on-going search for chlorine-resistant membranes for use in RO processes. A few representative patents relating to this problem are U.S. Pat. Nos. 4,302,336; 4,661,254; 4,913,816; 4,941,972 and 5,013,448.

Applicants are aware of only one publication that concerns gaseous chlorine permeation through polymeric films. This is a paper in the September, 1979, issue of Environmental Science and Technology, entitled, "A Personal Chlorine Monitor Utilizing Permeation Sampling," by Hardy et at. This paper describes a method of determining personal exposure to low levels of chlorine by equipping individuals with a small device the size of a radiation dosimeter, to be worn on the belt, for example. The device contains 10 ml of fluorescein-bromide absorbing solution, which is converted to eosin in the presence of chlorine. The amount of eosin present after a certain period of exposure can be measured and used to calculate the amount of chlorine to which the wearer has been exposed. A 25-μm silicone rubber membrane enables chlorine to enter the device, while preventing the absorbing solution from falling out.

Permeation of chlorine through the membrane into the device is concentration driven; no external driving force is provided. Thus permeation can be slow; as the reference points out, "the response may take several hours." The magnitude of the transmembrane flux does not matter, so long as some chlorine can pass into the device and the resulting eosin content can be compared with a previously made calibration curve. Furthermore, the membrane is not there to separate or concentrate chlorine from other components of the air—it simply provides a pathway by which chlorine can enter the device and come into contact with the liquid contained therein. The reference is silent as to any separating properties that the membrane may or may not have with regard to chlorine.

Also, since the device is only exposed to extremely low chlorine concentrations and would only be used for a few hours, stability of the membrane in the presence of chlorine is not an issue and is not discussed.

Thus, the known aggressive chemical properties of chlorine and the known membrane degradation problems experienced in RO applications would suggest that chlorine separation from gas or vapor streams is not a good candidate for a membrane-based system. To applicants' knowledge, there is an absence of any gaseous permeation or separation data available in the art.

SUMMARY OF THE INVENTION

The invention is a membrane process for removal and recovery of chlorine from gas streams. These gas streams may be effluent streams that would conventionally be subjected to some other treatment method or methods. Alternatively they may be internal process streams from which it is desirable to retrieve the chlorine for reuse or sale, for example. The process of the invention involves running the feedstream containing the chlorine across a membrane that is selectively permeable to the chlorine. The chlorine is therefore concentrated in the stream permeating the membrane; the non-permeating residue stream is depleted in chlorine content. The driving force for permeation across the membrane is the pressure difference on the feed and permeate sides. The efficiency of the process, in terms of the relative proportions of chlorine and other gases in the feed, permeate and residue streams, will be determined by a number of factors, including the pressure difference, the selectivity of the membrane, the proportion of the feed that permeates the membrane, and the membrane thickness.

The present invention teaches processes applicable to feedstreams ranging in concentration from dilute to concentrated. Preferably the process produces a permeate stream sufficiently concentrated that the chlorine can be recovered as a liquid by cooling and/or compressing the permeate stream. Eighty to 99% or above removal of the chlorine content of the feed can usually be achieved with one-step or two-step membrane systems. The process is particularly useful as an alternative to carbon tetrachloride absorption for treating gases from chlor-alkali plants and has a beneficial environmental impact, in that pollution from chlorine and carbon tetrachloride emissions can be reduced or eliminated. Economic calculations show that the process is substantially cheaper than conventional technologies for many feedstreams.

It is an object of the invention to provide a membrane process for efficiently removing chlorine from gas streams.

It is an object of the invention to provide a membrane process for efficiently recovering chlorine from gas streams.

It is an object of the invention to provide a membrane that can withstand the corrosive properties of chlorine-containing gas streams for prolonged periods.

It is an object of the invention to provide membrane processes that can be tailored to treat gas streams containing chlorine over a wide range of concentrations.

It is an object of the invention to reduce undesirable emissions to the atmosphere.

Other objects and advantages of the invention will be apparent from the description of the invention to those of ordinary skill in the art.

To achieve the foregoing objects, the invention provides a membrane-based process for treatment of chlorine-laden streams. The process involves running the stream across the feed side of a thin permselective membrane. The membrane is selectively permeable to the chlorine component of the feedstream, so that the chlorine component is enriched in the permeate compared with the feed. The permselective membrane materials used in the invention are preferably rubbery polymers at the operating conditions of the system, that is, they have glass transition temperatures below the temperature of the feed gas. Unexpectedly, we have found materials that provide good separation performance and good long-term stability, even in the presence of high concentrations of chlorine.

To achieve a high flux of the permeating components, the permselective layer of the membrane should be made as thin as possible, preferably less than 25 µm, more preferably less than 20 µm, still more preferably less than 10 µm, most preferably less than 5 µm. A preferred embodiment of the invention involves the use of a composite membrane comprising a microporous support, onto which the rubbery permselective layer is deposited as an ultrathin coating. The preparation of such membranes is known in the art, and is discussed in detail below.

The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible and are intended to be within the scope of the invention.

The flux of a gas or vapor through a polymer membrane is proportional to the pressure difference of that gas or vapor across the membrane. To achieve high fluxes of the permeating components, it is desirable not only to make the permselective membrane very thin, but also to operate the system with an appropriate pressure drop across the membrane. The pressure drop is preferably achieved by operating at pressure on the feed side or by drawing a partial vacuum on the permeate side of the membrane. Preferably, the permeate stream may be cooled and compressed to form a pure liquid solvent stream. The residue stream may be clean enough for direct discharge, or may be passed to a secondary treatment if necessary.

It is to be understood that the above summary and the following detailed description are intended to explain and illustrate the invention without restricting its scope.

DETAILED DESCRIPTION OF THE INVENTION

Figure 1:
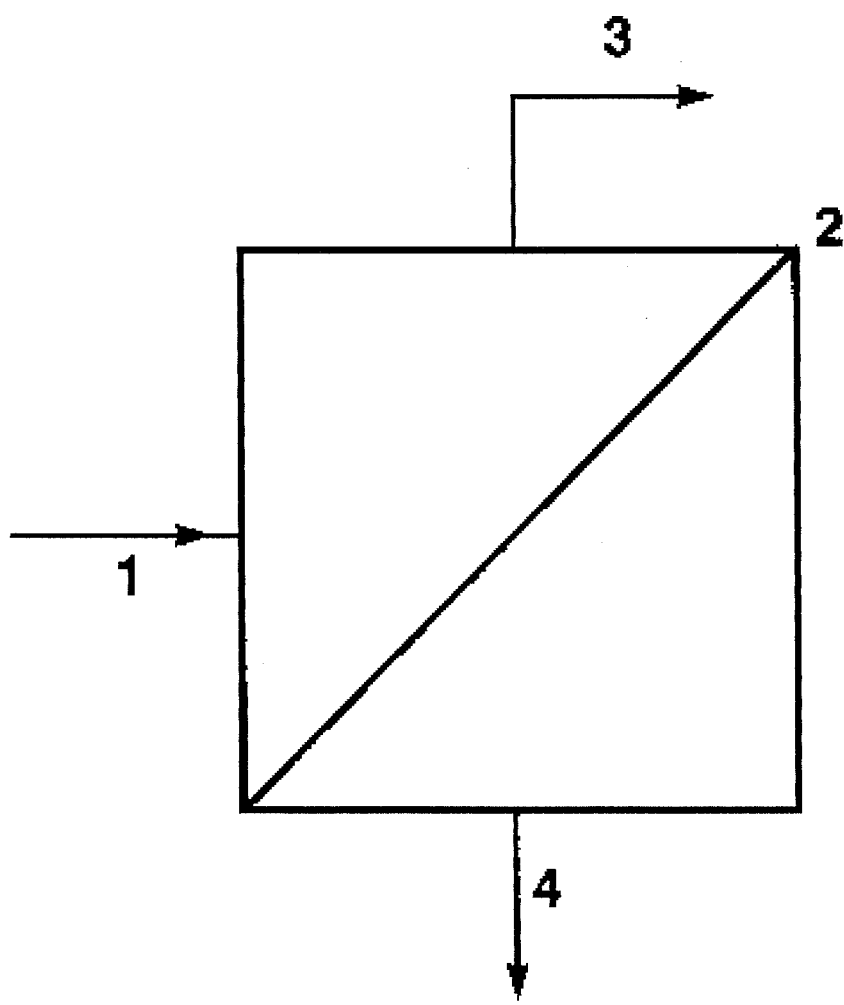
FIG. 1 is a schematic diagram of a single stage membrane system for treating a chlorine-laden stream.

The term permselective as used herein refers to polymers, or membranes made from those polymers, that exhibit selective permeation for at least one gas or vapor in a mixture over the other components of the mixture, enabling a measure of separation between the components to be achieved.

The term multilayer as used herein means a support membrane and one or more coating layers.

The term gas as used herein means gas or vapor.

The terms membrane unit or single-stage membrane unit as used herein mean one or more membrane modules arranged in parallel, so that a portion of the incoming gas stream passes through each one.

The term series arrangement means an arrangement of membrane modules or units connected together such that the residue stream from one module or unit becomes the feedstream for the next.

The term cascade arrangement means an arrangement of membrane modules or units connected together such that the permeate stream from one module or unit becomes the feedstream for the next.

Percentages used herein are by volume unless stated otherwise.

The scope of the present invention is not intended to be limited to any particular streams, but to encompass any situation where a gas stream containing chlorine is to be treated to separate chlorine. The feedstreams that can be treated by the process may contain chlorine in admixture with oxygen, nitrogen, carbon dioxide, hydrogen, or any other gases, and may contain chlorine and one other component, or chlorine and multiple other components.

The composition of the gas may vary widely, from a mixture that contains 100 ppm chlorine or less, to streams that contain larger amounts of chlorine, such as 5%, 10%, or 20%, to streams that contain chlorine as the major component. Tail gas from chlorine liquefaction plants is a major source of chlorine-containing streams. These plants may produce 100–1,000 scfm tail-gas, which contains as much as 40% chlorine. Another source of gas streams with high chlorine content is magnesium production. Magnesium plants can produce streams with flow rates of thousands of scfm, containing 90% chlorine. Other processes that emit chlorine-containing gas streams include: production of chlorinated chemicals, bleaching refrigeration and heat transfer fluids, chlorine transfer and clean-up operations, ore beneficiation, and wastewater treatment.

At the other end of the spectrum are streams containing only a few ppm chlorine. Such streams may be produced by diluting or pooling streams, for example.

In the process of the invention, a feedstream containing chlorine is passed across a thin, permselective membrane. The permselective membrane forms a barrier that is relatively permeable to chlorine, but relatively impermeable to the other gases.

Unexpectedly, in light of the known corrosive properties of chlorine, we have found that it is possible to manufacture membranes and membrane modules that can maintain their integrity and their separation performance in the presence of feedstreams containing chlorine, even at high concentrations, and even when subjected to high operating pressures.

Preferred embodiments of the invention employ a thin-film composite membrane comprising a microporous support onto which is coated a permselective layer of a rubbery polymer. The microporous support membrane should have a flow resistance that is very small compared to the permselective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable the skin to be coated with a defect-free permselective layer. The support membrane should resist the solvents used in applying the permselective layer.

Both the microporous support layer and the permselective layer must exhibit long-term stability in the presence of high concentrations of chlorine gas. Many materials commonly used to make membranes are unsuitable. Polyethylene, polypropylene, polysulfone, and cellulose acetate, for example, are all readily attacked by chlorine. Based on available literature and previous experiments, the following materials are all believed to be unsuitable: aromatic linear polyamides, fully crosslinked polyamides, ethylene-propylene, ethylene-propylene-diene, ethylene-propylene terpolymer, polyacetals, polystyrene, polybutadiene, polyurethanes, polycarbonate, and some silicones, such as silicone oils and low molecular weight (<10,000 g/mol) silicone rubbers.

In fact, we found only a few materials to be suitable for forming microporous support membranes: poly(tetrafluoroethylene), poly(vinylidene fluoride), and their copolymers. Other fluorinated, low-reactivity polymers, or other polymers characterized by many stable bonds and few, if any, unstable bonds, as discussed below, may also be suitable.

Poly(vinylidene fluoride) [PVDF] (Kynar® 461, Pennwalt Corp., Philadelphia, Pa.) is a preferred material for forming microporous support membrane. In addition to resistance to gaseous and liquid chlorine, asymmetric microporous PVDF membranes formed by a modified Loeb-Sourirajan process can be made that have a very small resistance to gas transport, as indicated by our typical pressure-normalized nitrogen flux of $1.5 \times 10^{-1}$ $cm^3(STP)/cm^2 \cdot s \cdot cmHg$. The thickness of the support membrane is not critical, since its permeability is high compared to that of the permselective layer. However the thickness would normally be in the range 100 to 300 microns, with about 150 microns being the preferred value. Optionally, the support membrane may be reinforced by casting it on a backing web.

Polymer materials to be used for the permselective layer must be resistant to chlorine gas and have acceptable flux and selectivity characteristics. The chemical resistance of polymers to chlorine depend on the number of reactive bonds and groups that exist in the polymer chain. Some materials with reactive bonds and groups can be made more stable, hence less reactive, by crosslinking. Unexpectedly, we found that crosslinked rubbery polymers were resistant to chlorine. Highly-crosslinked silicone rubber was very resistant. Other materials that were found to be stable, or could be made more stable by crosslinking, include chlorosulfonated polyethylene (CSE), ethylene-propylene-diene terpolymer (EPD), and ethylene-propylene copolymer (EPM). As described in more detail in Example 7, we carded out two-month pure chlorine gas tests with candidate materials. Based on the experimental data gathered from Examples 1–7, we chose a PVDF support membrane coated with a thin selective layer of crosslinked silicone rubber for module testing. This membrane exhibited high chlorine/nitrogen selectivities, independent of the chlorine partial pressure in the feed stream. The membrane maintained its performance levels in long-term chlorine contact and even after exposure to 100% chlorine feedstreams.

To achieve high fluxes, such as at least $1 \times 10^{-6}$ $cm^3/cm^2.s.cmHg$, more preferably $1 \times 10^{-5}$ $cm^3/cm^2.s.cmHg$, most preferably $1 \times 10^{-4}$ $cm^3/cm^2.s.cmHg$, the permselective layer should be thin. Preferably the thickness of the permselective layer will be less than 25 µm, more preferably less than 20 µm, still more preferably less than 10 µm, and most preferably less than 5 µm. The preferred method of depositing the permselective layer is by dip coating. The dip-coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. Assuming an exemplary 1 wt % concentration of polymer in the solution, a film 0.5–1 micron thick is left on the support after evaporation of the solvent.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material. This, technique is well-known in the art, and is described, for example, by W. J. Ward, et al. in "Ultrathin Silicone/Polycarbonate Membranes for Gas Separation Processes," *Journal of Membrane Science* (1), 1976.

The permselective membranes used in the present invention should preferably have a selectivity for chlorine over nitrogen of at least 10, more preferably at least 20, and most preferably at least 30. We have found that the membrane materials disclosed above provide such selectivity. We have also found that selectivity improves at lower temperatures. Therefore, the preferred mode, where convenient, is operation at below room temperature, that is, at below 20° C., and more preferably still is operation at below 0° C. In a chlorine liquefaction plant, this is easily attainable, since the liquefaction process requires chilling to −20° C. and often lower. Running the membrane system with a chilled feed stream improves separation performance, and has the added advantage of retarding any degradation of the membrane and module components. We expect membrane degradation, hence membrane performance, to be as much as 3- to 10-fold slower at about −10° C. or −20° C. than at room temperature.

The form in which the membranes are used in the invention is not critical. They may be used, for example, as flat sheets or discs, coated hollow fibers, or spiral-wound modules, all forms that are known in the art. Spiral-wound modules are a preferred choice. As with the membrane material itself, all module materials must be resistant to long-term exposure to high concentrations of chlorine. References that teach the preparation of spiral-wound modules are S. S. Kremen, "Technology and Engineering of ROGA Spiral Wound Reverse Osmosis Membrane Modules", in Reverse Osmosis and Synthetic Membranes, S. Sourirajan (Ed.), National Research Council of Canada, Ottawa, 1977; and U.S. Pat. No. 4,553,983, column 10, lines 40–60. Alternatively, the membranes may be configured as microporous hollow fibers coated with the permselective polymer material and then potted into a module, described, for example, in U.S. Pat. No. 5,344,702, to Haubs et al.

The process of the invention can be carried out using system designs tailored to particular requirements in terms of percentage of chlorine removed from the feed, or degree of concentration of the permeate. The process in its most general form is shown schematically in FIG. 1. Referring now to this figure, the feed stream, 1, passes through a membrane unit, 2, containing one or more membrane modules. The treated stream, 3, is discharged to the atmosphere, recycled to the process, or subjected to post-treatment. The permeate vapor, 4, enriched in chlorine, can be passed to a collection vessel, recirculated, or sent to any other desired destination. A driving force is needed to power the process. The driving force may be provided by a vacuum pump on the permeate side of the membrane, a compressor on the feed side, or both, for example.

Figure 2:
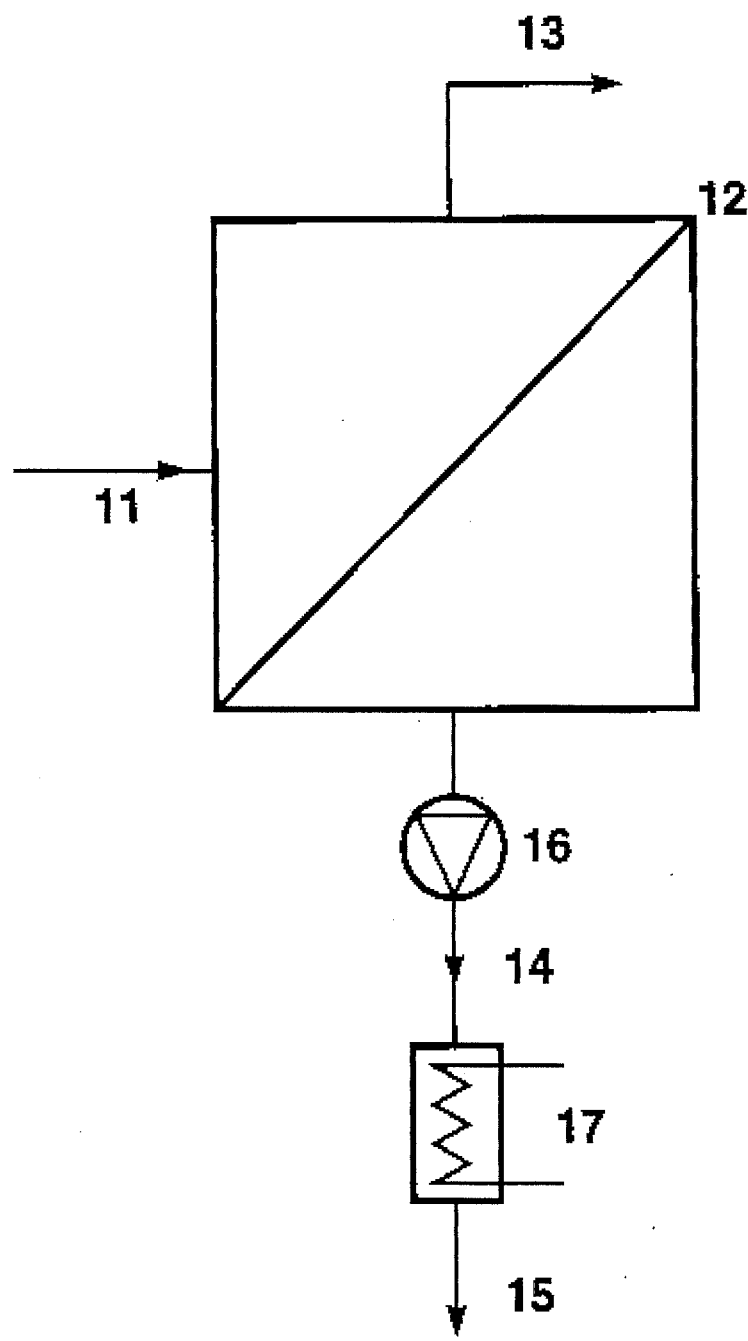
FIG. 2 is a schematic diagram of a low-pressure embodiment of the membrane system.

A low-pressure embodiment in which the driving force is provided by a vacuum pump on the permeate side is shown in FIG. 2. Referring now to this figure, the feed stream, 11, passes through a membrane unit, 12. The treated stream, 13, is discharged to the atmosphere, recycled to the process, or subjected to post-treatment. A vacuum pump, 16, is used on the permeate side of the membrane unit, and the permeating vapor stream, 14, passes through condenser, 17, where it condenses to a liquid chlorine stream, 15. Of course, if a gaseous product is desired, the condenser is unnecessary. The vacuum on the permeate side can be anywhere in the range from a hard vacuum of 1 mmHg or less, to just below atmospheric pressure, that is, about 759 mmHg.

Figure 3:
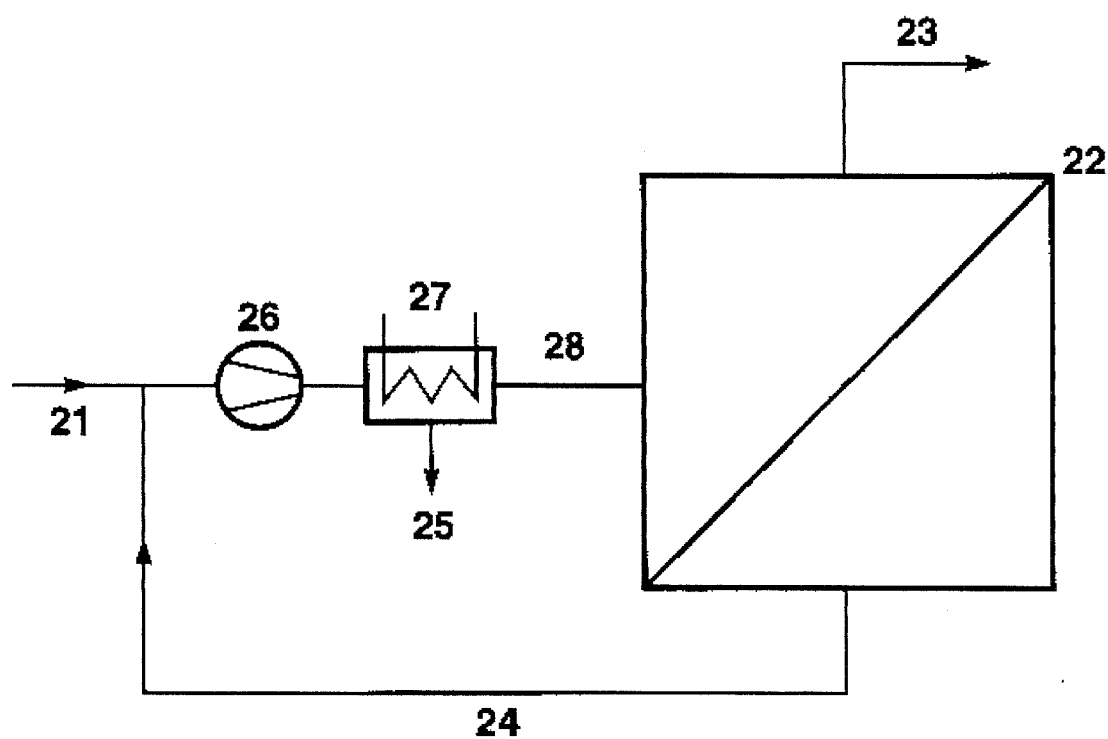
FIG. 3 is a schematic diagram of a high-pressure embodiment of the membrane system.

A high-pressure embodiment in which the driving force is provided by a compressor on the feed side is shown in FIG. 3. Referring now to this figure, the feed stream, 21, passes through a compressor, 26, then to a condenser, 27, where a portion of the stream condenses to a liquid chlorine stream, 25. The non-condensing portion, 28, passes to a membrane unit, 22. The treated stream, 23, is discharged to the atmosphere, recycled to the process, or subjected to post-treatment. The chlorine-enriched permeate stream, 24, is returned upstream of the compressor for further condensation. Again, if a gaseous product is desired, the condensation step is unnecessary. The pressure on the feed side can be raised to any convenient value, such as 50 psig, 100 psig, 150 psig, 200 psig, 500 psig, or above. It is preferred to avoid very high pressures, such as above 300 psig, for prolonged operation, since this tends to exacerbate membrane and module degradation by chlorine.

A typical target of the process may be to create a residue stream that is essentially chlorine-free, such as containing less than 1 ppm chlorine, that can be vented directly to the atmosphere. If venting of streams with higher chlorine content is permitted, or the stream is not to be vented, or the stream is to be subjected to further treatment, for example, typical target chlorine concentrations for the residue might be 10 ppm, 100 ppm, 1,000 ppm, 1% or higher.

A single-stage membrane unit is generally able to remove 80%, 90% or more of the chlorine from the feed, depending on the membrane characteristics and operating conditions. If this is inadequate, a two-step or multistep process, in a series arrangement where the residue from the first unit forms the feed to the second, may be used. If each unit can remove 90% of the feed gas reaching it, then a two-step arrangement will remove 99% of the chlorine content of the raw gas, a three-step will remove 99.9% and so on. Such multistep series arrangements are well known in the art. A typical configuration is shown and described in U.S. Pat. No. 4,906,256, FIG. 4 and Column 13, lines 41–64, which is incorporated herein by reference.

If desired, the residue stream may be subjected to additional non-membrane treatment, such as scrubbing with caustic soda, or some form of adsorption, for example, pressure swing adsorption, as described in U.S. Pat. No. 5,376,164, to Zarchy et al.

The target composition for the chlorine-enriched permeate stream will also vary, depending upon its destination. Again depending on the membrane characteristics and operating conditions, a single-stage membrane unit is typically able to achieve 3-fold, 5-fold or 10-fold enrichment of the chlorine concentration of the permeate compared with the feed. If the feed concentration is relatively high, such as a few percent or above, this level of enrichment may be adequate. If the permeate stream is to be liquefied to yield a liquid chlorine product, a permeate concentration of at least 20% or higher, such as at least 30% or 40%, is preferred to facilitate condensation under moderate temperature and pressure conditions. If this degree of enrichment cannot be obtained in a single-stage unit, a two-stage or multistage process, in a cascade arrangement where the permeate from the first unit forms the feed to the second, may be used. Such arrangements are again common in the art, and an example of a two-stage design, with optional condensers, may be found in U.S. Pat. No. 4,906,256, FIG. 3 and Column 13, lines 18–41, which is incorporated herein by reference.

Many other membrane system configurations that could be used in membrane-based chlorine separation are known. For example, U.S. Pat. No. 5,071,451, incorporated herein by reference in its entirety, describes membrane system designs in which efficiency is improved by attaching an ancillary module or modules on the permeate side of the main membrane unit, but without a full second stage. U.S. Pat. No. 5,256,296, FIG. 5 and Column 8, line 32 to Column 10, line 7, incorporated herein by reference, shows and describes a similar design, but without a condenser, in which product concentration is built up in a loop on the permeate side of the main membrane unit. U.S. Pat. No. 5,256,295, FIG. 5 and Column 8, line 26 to Column 10, line 6, incorporated herein by reference, shows and describes a two-stage design with ancillary module or modules. The process of the invention is intended to embrace these and any other suitable system configurations.

Figure 4:
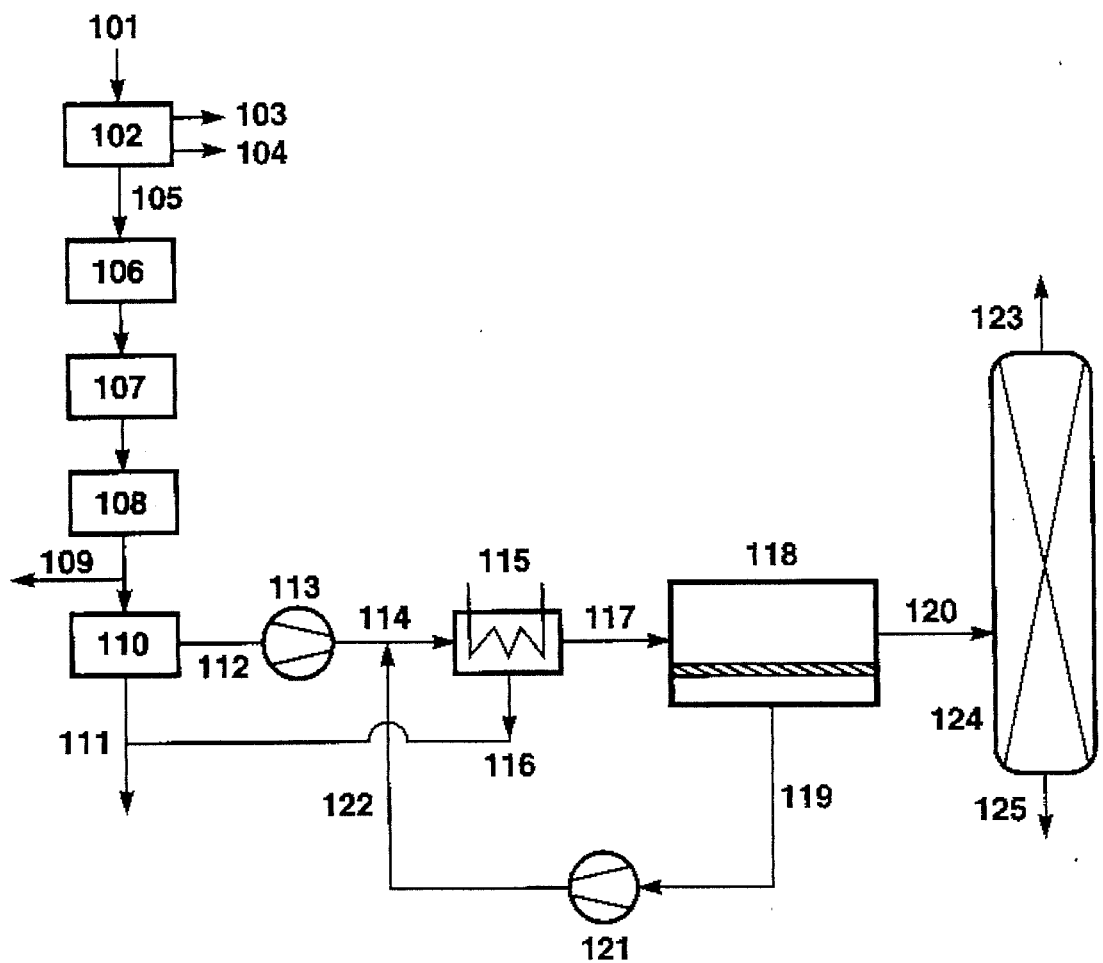
FIG. 4 is a schematic diagram of a typical chlorine production process including the application of a membrane system for tail-gas treatment and chlorine recovery.

FIG. 4 shows an outline of a typical chlor-alkali chlorine production process with the application of a membrane system to the tail-gas treatment and chlorine recovery. An aqueous solution of sodium chloride (brine), 101, is introduced into an electrolysis cell, 102, where it decomposes, producing sodium hydroxide, 103, hydrogen, 104, and chlorine gas, 105. The raw chlorine gas is subjected to a series of processing steps, typically including cooling and drying, 106, such as with sulfuric acid, compression, 107, and removal of impurities by absorption/desorption or otherwise, 108. The clean gas may be drawn off as a gaseous chlorine product, 109, or subjected to condensation, 110, by further compression, chilling, or both, to yield a liquid chlorine product, 111, for sale or use. The tail gas, 112, of the primary liquefaction process forms the feed stream to the membrane process.

This feed stream passes through a compressor, 113, and is fed to a condenser, 115, where a portion of the stream is condensed to a liquid chlorine stream, 116. The non-condensing portion, 117, passes through a membrane unit, 118. The chlorine-enriched permeate stream, 119, is recompressed by compressor, 121, and the resultant stream, 122, is joined with compressed stream 114 for further condensation. The chlorine-depleted residue stream, 120, is subjected to a final disposal step, usually a caustic scrub tower, 124. The chlorine-free vent stream, 123, meets discharge standards. The residue, 125, from the scrubbing process is a usable sodium hypochlorite solution. Where the sodium hypochlorite is not marketable or creates a disposal problem, the solution can be decomposed catalytically to regenerate and recover sodium chloride which can be recycled to the brine feed, 101.

The advantages of the processes of the invention are multi-fold. The processes produce virtually no emissions and create no secondary waste, thereby relieving chlorine producers of the need for any additional treatment to bring the discharge streams to acceptable levels. The processes eliminate the use of carbon tetrachloride, a known ozone-depleting chemical. Further, they provide an alternative treatment to apply when carbon tetrachloride will no longer be available in the U.S., and perhaps in the rest of the word. The processes are flexible, reliable, and low maintenance, employing few moving parts. A membrane system can easily be integrated into an existing process train. In may cases, the membrane system can be operated to produce a permeate stream having a hydrogen content that is below the lower explosive limit, thereby reducing the need for dilution and other monitoring and control systems downstream of the membrane unit. Finally, the processes allow the recovery, and subsequent sale, of a greater quantity of chlorine than can be recovered from existing processes, without the additional costs associated with the use of carbon tetrachloride.

The invention is now further illustrated by the following examples, which are intended to be illustrative of the invention, but are not intended to limit the scope or underlying principles of the invention in any way.

EXAMPLE 1

Membrane Materials Selection and Membrane Making

An asymmetric, microporous poly(vinylidene fluoride) [PVDF] support membrane was prepared. Composite membranes were prepared using the following coating solutions:

- 5 wt % chlorosulfonated polyethylene (CSE), (Hypalon, R. T. Vanderbilt), in methyl ethyl ketone.
- 2.2 wt % ethylene-propylene-diene terpolymer (EPD), (Scientific Polymer Products, Inc.), in toluene.
- 2 wt % ethylene-propylene copolymer (EPM), (Scientific Polymer Products, Inc.), in cyclohexane.
- 15 wt % crosslinked silicone rubber, (Wacker Adhesive Inc.) in isooctane. (Crosslinking was accomplished by mixing a low molecular weight silicone oligomer with a peroxide-based crosslinking agent and a chloroplatinic acid-based catalyst.)

The support membranes were dip-coated in a solution of one of the three selective polymer solutions or the silicone rubber solution at 1 ft/min coating speed, then dried in an oven at 60° C. for 20 minutes. The resulting membranes had a selective layer thickness ranging from 1 to 15 μm. Samples of each finished composite membrane were cut into 12.6 cm$^2$ stamps and tested in a permeation test-cell apparatus with pure oxygen and pure nitrogen at 23° C. feed temperature and 50 psig feed pressure. The gas fluxes of the membranes were measured, and the oxygen/nitrogen selectivities were calculated. Any membrane with a selectivity less than the intrinsic selectivity of the material was considered defective. Table 1 summarizes the selectivities of the composite membranes.

TABLE 1

| Membrane | Nitrogen Pressure-Normalized Flux × 10$^6$ (cm$^3$/cm$^2$ · s · cmHg) | Oxygen/Nitrogen Selectivity (−) | Intrinsic Selectivity of Polymer (−) |
|---|---|---|---|
| CSE | 50 | 0.9 | 2.4 |
| EPD | 2.5 | 3.0 | 3.0 |
| EPM | 2.1 | 2.8 | 2.9 |
| Silicone Rubber | 11 | 2.1 | 2.2 |

The chlorosulfonated polyethylene (CSE) membrane was essentially unselective to oxygen over nitrogen, whereas the intrinsic selectivity of the CSE material is about 2.4. This indicates that there were defects in the membrane, probably caused by the methyl ethyl ketone coating solvent attacking the support membrane. The other three membranes were essentially defect-free and exhibited high nitrogen fluxes. These membranes were evaluated further with a chlorine/nitrogen mixture.

EXAMPLE 2

Permeation Properties of an Ethylene-Propylene-Diene (EPD) Membrane Stamp

Membranes were prepared as in Example 1. The ethylene-propylene-diene composite membrane was cut into 12.6-cm$^2$ stamps, and tested using a gas mixture of about 4.5% chlorine in nitrogen at a feed temperature of 23° C. The stamps were mounted in a test cell and subjected to permeation experiments using the same general procedure as in Example 1. Measurements were made at three feed pressures, hence at three chlorine partial pressures. The stage-cut, defined as a ratio of permeate flow rate to feed flow rate, was maintained at less than 1%. The permeate side was maintained at atmospheric pressure. During each test, the feed, permeate, and residue compositions were analyzed by gas chromatography (GC). The pressure-normalized fluxes of chlorine and nitrogen and the chlorine/nitrogen selectivity were calculated using an in-house computer program. Results are shown in Table 2.

TABLE 2

| Feed Pressure (psia) | Chlorine Partial Pressure (psia) | Pressure-Normalized Flux × 10$^6$ (cm$^3$/cm$^2$ · s · cmHg) | | Chlorine/Nitrogen Selectivity (−) |
|---|---|---|---|---|
| | | Chlorine | Nitrogen | |
| 65 | 2.9 | 28 | 1.5 | 18 |
| 115 | 5.3 | 26 | 1.2 | 21 |
| 165 | 7.6 | 31 | 1.3 | 23 |

EXAMPLE 3

Permeation Properties of an Ethylene-Propylene Copolymer (EPM) Membrane Stamp

Membranes were prepared as in Example 1. The ethylene-propylene copolymer composite membrane was cut into 12.6-cm$^2$ stamps. The stamps were mounted in a test cell and subjected to permeation experiments using the same general procedure as in Example 2. Results are shown in Table 3.

TABLE 3

| Feed Pressure (psia) | Chlorine Partial Pressure (psia) | Pressure-Normalized Flux × 10$^6$ (cm$^3$/cm$^2$ · s · cmHg) | | Chlorine/Nitrogen Selectivity (−) |
|---|---|---|---|---|
| | | Chlorine | Nitrogen | |
| 65 | 2.6 | 12 | 1.1 | 12 |
| 115 | 4.6 | 38 | 1.0 | 38 |
| 165 | 6.9 | 48 | 1.2 | 40 |

EXAMPLE 4

Permeation Properties of a Silicone Rubber Membrane Stamp

Membranes were prepared as in Example 1. The silicone rubber composite membrane was cut into 12.6-cm$^2$ stamps. The stamps were mounted in a test cell and subjected to permeation experiments using the same general procedure as in Example 2. Results are shown in Table 4.

TABLE 4

| Feed Pressure (psia) | Chlorine Partial Pressure (psia) | Pressure-Normalized Flux × 10$^6$ (cm$^3$/cm$^2$ · s · cmHg) | | Chlorine/Nitrogen Selectivity (−) |
|---|---|---|---|---|
| | | Chlorine | Nitrogen | |
| 65 | 2.5 | 190 | 5.9 | 32 |
| 115 | 4.5 | 190 | 6.0 | 32 |
| 165 | 6.9 | 160 | 5.9 | 27 |

EXAMPLE 5

Effect of Feed Chlorine Partial Pressure on Chlorine/Nitrogen Selectivity

Figure 5:
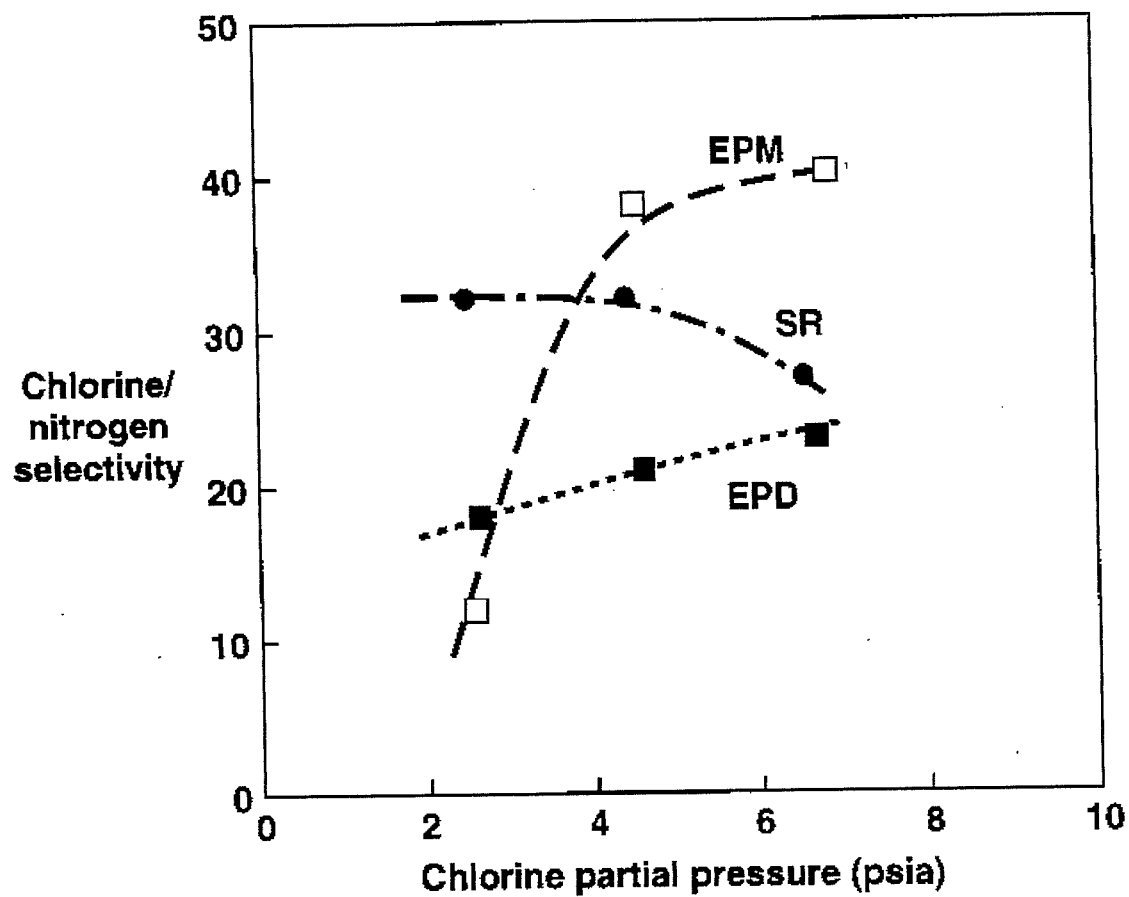
FIG. 5 is a graph showing the effect of feed chlorine partial pressure on chlorine/nitrogen selectivity.

Results from Examples 2–4 were compared and plotted graphically. Results are shown in FIG. 5. All materials showed acceptable pressure-normalized flux and selectivity for chlorine over the partial pressure range studied. For convenience, one material, silicone rubber, was selected for use in making and testing membrane modules.

EXAMPLE 6

Effect of Feed Temperatures on Membrane Stamps

Figure 6:
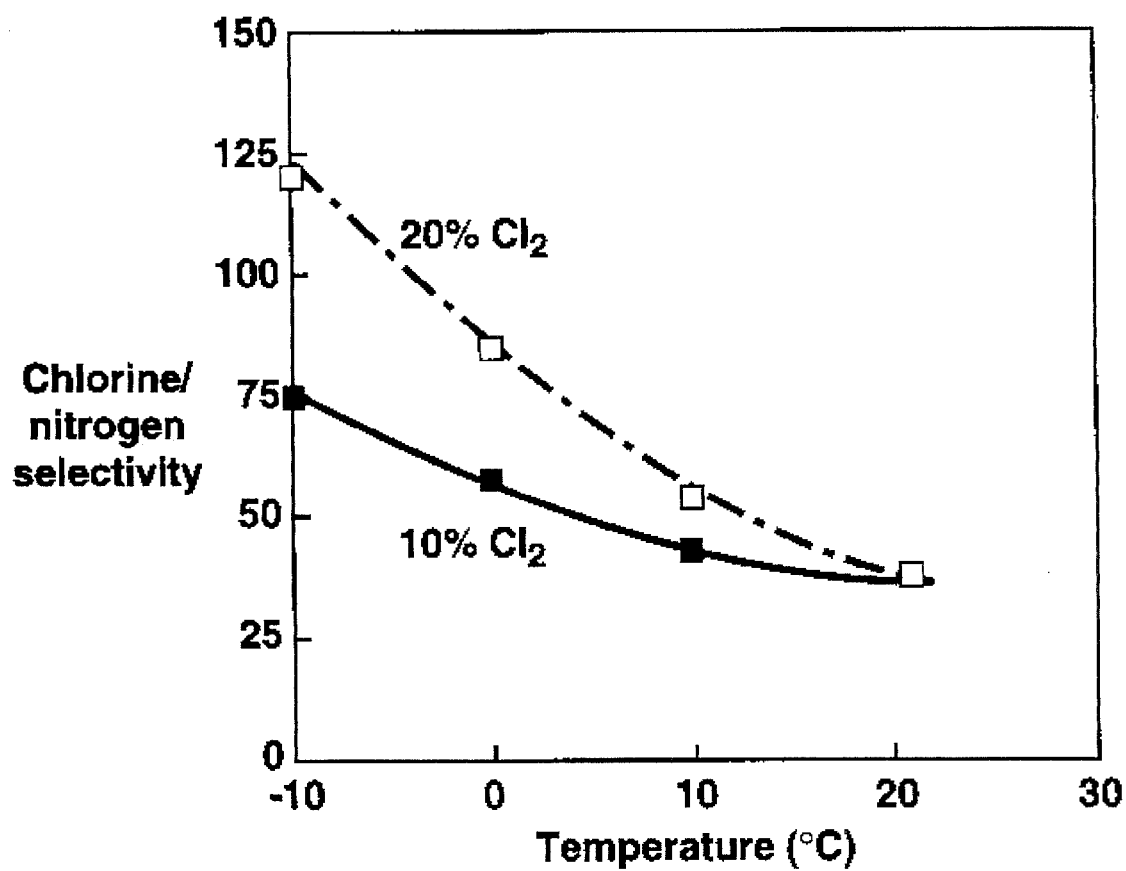
FIG. 6 is a graph showing the effect of feed temperature on chlorine/nitrogen selectivity.

An experiment was carried out to determine membrane performance at different temperatures. Silicone rubber composite membranes were prepared using the same general technique as in Example 1. Stamps with an area of 12.6 cm$^2$ were cut out and subjected to permeation tests following the general procedure as described in Example 2, using mixtures containing 10% chlorine in nitrogen and 20% chlorine in nitrogen. The feed pressure was 50 psig, the permeate pressure was atmospheric, and the stage cut was $\leq 1\%$. The permeation properties were measured at four temperatures: $-10°$ C., $0°$ C., $10°$ C., and $20°$ C. These temperatures were obtained by immersing the test cell in a low-temperature circulating bath of ethylene glycol solution. The results are presented in FIG. 6. The decrease in temperature increases the chlorine flux, but decreases the nitrogen flux, resulting in increased selectivity.

EXAMPLE 7

Membrane Stamp and Module Internals Stability Tests

Experiments were carried out to determine the stability of the membrane materials and membrane module components in the presence of chlorine. Samples of candidate membranes and module components were placed in a leak-free stainless steel pressure vessel. The vessel inlet was connected to a chlorine gas cylinder. The outlet stream from the vessel passed through a scrubber containing 50% sodium hydroxide solution to absorb chlorine. The vessel was first pressurized with pure chlorine to remove air, then depressurized. It was then filled with pure chlorine at 30 psig pressure and 23° C. After a week, the vessel was depressurized and purged with nitrogen, and the contents were removed. The condition and integrity of the contents were checked visually and by physical tests. The membranes were further tested by gas permeation measurements, and the results were the criteria for assessing membrane stability. Materials that appeared to be chlorine resistant were returned to the vessel, and the test was continued for another week. The stability tests were continued for more than two months.

The permeation properties of membrane materials over the stability test period are summarized in Table 5. The numbering of the membranes indicates the number of coats of the polymer solutions applied to the support membranes; therefore, the numbering also indicates relative thickness of the permselective layers. The results of physical integrity tests of module components are shown in Tables 6 and 7.

TABLE 5

| | Gas Permeation Properties | | | | | | | |
|---|---|---|---|---|---|---|---|---|
| | Initial | | After 24 days | | After 44 days | | After 65 days | |
| Membrane | N$_2$ Flux* | O$_2$/N$_2$ Selectivity | N$_2$ Flux* | O$_2$/N$_2$ Selectivity | N$_2$ Flux* | O$_2$/N$_2$ Selectivity | N$_2$ Flux* | O$_2$/N$_2$ Selectivity |
| SR1 | 11 | 2.1 | 3.6 | 2.4 | 3.4 | 2.4 | 1.0 | 2.5 |
| SR2 | 33 | 2.1 | 8.0 | 2.4 | 4.9 | 2.3 | 4.0 | 2.4 |
| SR3 | 72 | 2.1 | 17 | 2.3 | 15 | 2.4 | 7.7 | 2.4 |
| EPD1 | 1.0 | 3.4 | — | — | — | — | — | — |
| EPD2 | 2.5 | 3.1 | 0.2 | 1.1 | 0.1 | 2.5 | — | — |
| EPM1 | 4.2 | 3.6 | 0.2 | 3.0 | 0.1 | 1.4 | 37 | 0.9 |
| EPM2 | 1.4 | 3.6 | 0.3 | 1.5 | 0.6 | 1.0 | 47 | 0.9 |
| PVDF | 130,000 | 1.0 | 133,000 | 1.0 | 61,400 | 1.0 | 51,000 | 1.0 |

(*): Units of flux: 10$^6$ cm$^3$/cm$^2$ · s · cmHg
(—): Too Low to Detect

TABLE 6

| | Physical properties | | | | | |
|---|---|---|---|---|---|---|
| Spacer | After 24 days | | After 44 days | | After 65 days | |
| Material | Brittleness | Strength | Brittleness | Strength | Brittleness | Strength |
| Naltex | G | E | G | E | G | U |
| Kynar | E | E | E | E | E | E |
| Tricot | F | F | F | F | F | F |
| Zicot | E | E | E | E | G | U |
| Polyester | E | E | E | E | F | U |
| Housing Material | | | Corrosion Resistance | | | |
| Stainless steel | F | F | F | F | F | F |
| Aluminum | E | E | G | G | G | G |
| PVC | E | E | E | E | E | E |

(E): Excellent; (G): Good; (F): Fair; (U): Unsatisfactory

TABLE 7

| Glue/ Contact Surface | Overall Stability Performance | | | |
|---|---|---|---|---|
| | After 14 days | After 24 days | After 44 days | Comments |
| Epoxy 1/polyester | E | E | G | Expensive |
| Epoxy 1/SR | U | U | U | Does not stick |
| Flexible epoxy/polyester | G | G | F | Acceptable |
| Flexible epoxy/SR | G | G | U | |
| Industrial plastic adhesive/polyester | G | G | F | |
| Industrial plastic adhesive/SR | E | E | G | Acceptable |
| General purpose adhesive/polyester | E | E | F | |
| General purpose adhesive/SR | F | U | U | |
| Urethane adhesive 2/polyester | E | E | F | Acceptable |
| Urethane adhesive 2/SR | U | U | U | Does not stick |

(E): Excellent; (G): Good; (F): Fair; (U): Unsatisfactory

For convenience, one membrane and selected module materials were chosen for incorporation into spiral-wound modules, and the modules were subjected to further testing.

EXAMPLE 8

Module Making

Four spiral-wound membrane modules were constructed using materials found to be resistant to chlorine in the stability tests. The modules were rolled using a silicone rubber/PVDF composite membrane prepared as in Example 1, with a 20-µm-thick silicone rubber selective layer. The modules were 12-inches long and 2 inches in diameter. The modules were subjected to integrity tests using the same permeation apparatus as in Example 1, and results are given in Table 8. Based on the initial oxygen/nitrogen selectivity tests, two modules were considered to be defective. The remaining two modules were used for the performance tests described below.

TABLE 8

| Module Number | Oxygen Pressure-Normalized Flux × 10⁶ (cm³/cm² · s · cmHg) | Nitrogen Pressure-Normalized Flux × 10⁶ (cm³/cm² · s · cmHg) | Oxygen/Nitrogen Selectivity (−) | Status |
|---|---|---|---|---|
| 1 | 16.1 | 7.7 | 2.1 | destroyed |
| 2 | high | high | 0.8 | severe leaks |
| 3 | 9.0 | 4.2 | 2.1 | OK |
| 4 | 8.6 | 4.1 | 2.1 | OK |

EXAMPLE 9

Effect of Feed Pressure on the Performance of a Membrane Module

One of the modules of Example 8 was used in the test apparatus of Example 1 to determine the gas permeation properties under varying feed pressure conditions. The results are presented in Table 9.

TABLE 9

| Feed Pressure (psig) | Stage-Cut (%) | Chlorine Content (%) | | | Pressure-Normalized Flux × 10$^6$ (cm$^3$/cm$^2$ · s · cmHg) | | Chlorine/ Nitrogen Membrane Selectivity |
|---|---|---|---|---|---|---|---|
| | | Feed | Residue | Permeate | Chlorine | Nitrogen | |
| 50 | 4.4 | 4.4 | 3.9 | 13.6 | 100 | 9.3 | 11.2 |
| 100 | 8.4 | 4.4 | 3.1 | 18.6 | 130 | 8.6 | 15.3 |
| 125 | 9.7 | 4.4 | 2.7 | 19.9 | 124 | 7.9 | 15.7 |

Temperature: 23° C.; membrane area: 1,600 cm$^2$.

Membrane selectivity increases with increasing feed pressure. This increase results from an increase in the chlorine flux and a decrease in the nitrogen flux.

After the mixture test, the module was purged with pure chlorine for three days, then retested with pure nitrogen and oxygen to check for module integrity. The oxygen/nitrogen selectivity decreased to 1.7 compared with 2.1 obtained originally, indicating that defects had formed in the module. A dye test performed to locate the defects showed some creases in the membrane envelope and pin holes on the glue line. All other module tests were performed with the second module.

EXAMPLE 10

Effect of Feed Composition on the Performance of a Membrane Module

The second defect-free module of Example 8 was used in the test apparatus of Example 1 to determine the effect of changing feed composition on chlorine/nitrogen selectivity. The results are shown in Table 10.

TABLE 10

| Feed Pressure (psig) | Temp. (°C.) | Feed Chlorine Content (%) | Feed Chlorine Activity (—) | Pressure-Normalized Flux × 10$^6$ (cm$^3$/cm$^2$ · s · cmHg) | | Chlorine/ Nitrogen Selectivity (—) |
|---|---|---|---|---|---|---|
| | | | | Chlorine | Nitrogen | |
| 50 | 23 | 10.6 | 0.06 | 80 | 2.5 | 32 |
| 100 | 23 | 10.6 | 0.11 | 83 | 2.5 | 33 |
| 130 | 23 | 10.6 | 0.13 | 110 | 2.6 | 42 |
| 50 | 23 | 19.5 | 0.11 | 57 | 1.7 | 34 |
| 100 | 23 | 21.3 | 0.21 | 78 | 2.3 | 34 |
| 125 | 23 | 21.3 | 0.26 | 110 | 2.9 | 38 |
| 25 | 23 | 100 | 0.35 | 260 | — | — |
| 20 | 15 | 100 | 0.30 | 530 | — | — |

Membrane Area: 1,340 cm$^2$; Stage-Cut: <2%.

Figure 7:
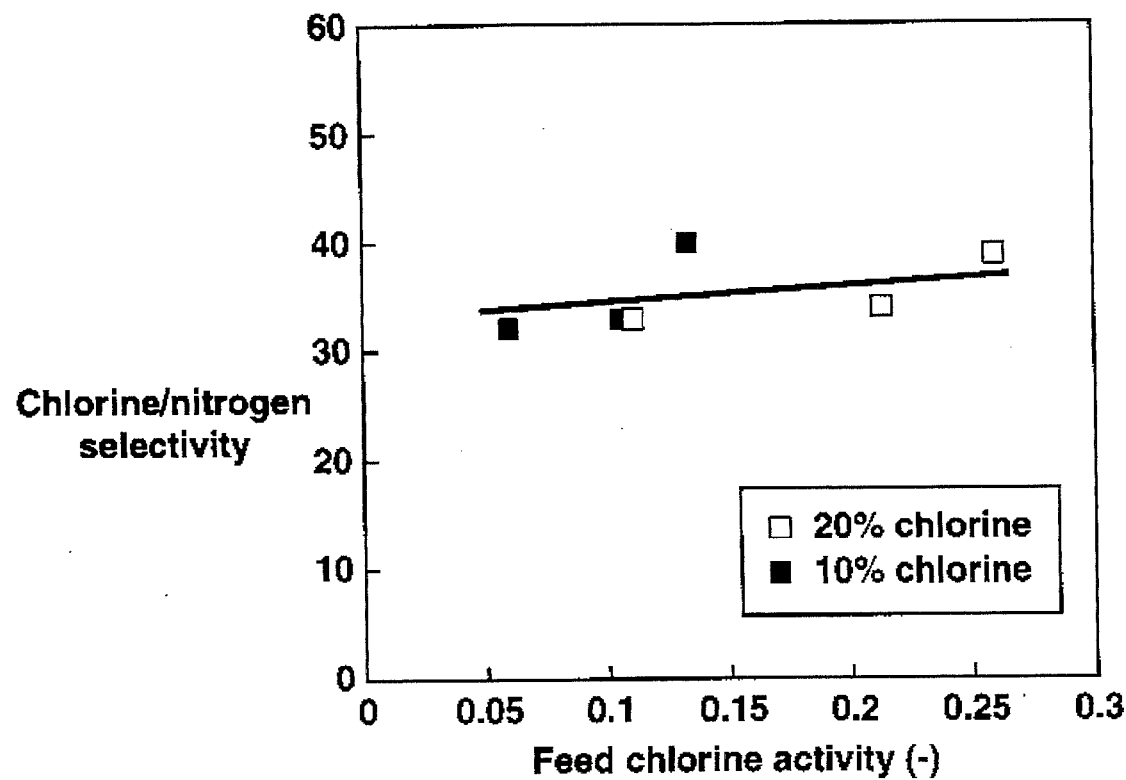
FIG. 7 is a graph showing the effect of feed chlorine activity on chlorine/nitrogen selectivity.

In FIG. 7, the feed chlorine activity (defined as the ratio of the partial pressure of chlorine in the feed to its vapor pressure at the experimental temperature) is plotted against the chlorine/nitrogen selectivity of the silcone rubber module. The feed activity of chlorine can be increased either by increasing the feed pressure or the feed chlorine content, or by lowering the operating temperature. FIG. 7 shows that, in the range of feed chlorine activities investigated, the selectivity does not change significantly, and is in the range 32–42.

EXAMPLE 11

Effect of Membrane Thickness on Separation Performance

Figure 8:
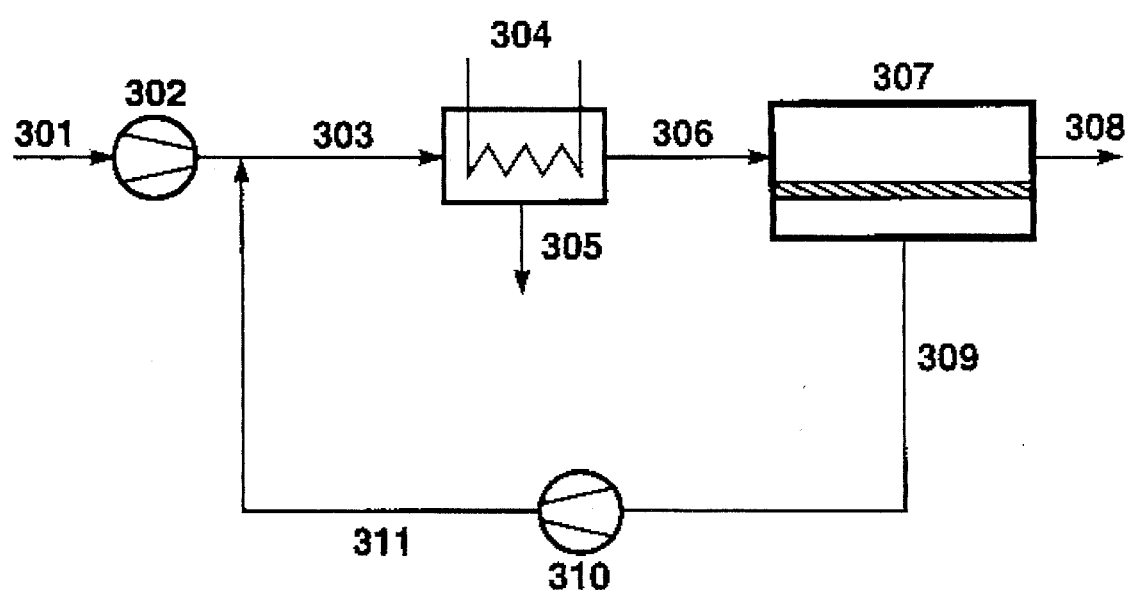
FIG. 8 is a schematic diagram of the membrane separation process used in the computer modelling program.

An in-house computer modelling program was used to predict the membrane area required to carry out a separation process, as shown in FIG. 8. In this process, the feed stream, 301, passes through a compressor, 302, and is fed to a condenser, 304, where a portion of the stream is condensed to a liquid chlorine stream, 305. The non-condensing portion, 306, passes to a membrane unit, 307. The chlorine-enriched permeate stream, 309, is recompressed by compressor, 310, and the resultant stream, 311, is joined with compressed stream 303 for further condensation. The chlorine-depleted residue stream, 308, may be subjected to post-treatment.

The input conditions used in our calculations were based on the experimentally-measured selectivity of the 20-μm-thick silicone rubber membrane stamp. Table 11 lists these and other assumptions.

TABLE 11

| Parameter | Value |
|---|---|
| Feed stream composition | 28/72 mol % chlorine/nitrogen |
| Feed flow rate | 500 scfm at 25° C. and 115 psia |
| Operating pressure | 215 psia |
| Permeate pressure | 14.7 psia |
| Chlorine pressure-normalized flux | 75 × 10$^{-6}$ cm$^3$/cm$^2$ · s · cmHg |
| Nitrogen pressure-normalized flux | 2.5 × 10$^{-6}$ cm$^3$/cm$^2$ · s · cmHg |
| Chlorine/nitrogen selectivity | 30 |
| Chlorine residue concentration | 0.1 mol % |

The calculations were performed for three membrane thicknesses: 3.5 µm, 10 µm, and 20 µm. The results are given in Table 12.

TABLE 12

| Membrane Thickness (µm) | 3.5 | 10 | 20 |
|---|---|---|---|
| Chlorine pressure-normalized flux, (cm$^3$/cm$^2$ · s · cmHg) | 230 × 10$^{-6}$ | 120 × 10$^{-6}$ | 75 × 10$^{-6}$ |
| Chlorine/nitrogen selectivity | 30 | 30 | 30 |
| Residue: | | | |
| concentration (mol % Cl$_2$) | 0.1 | 0.1 | 0.1 |
| flow rate (scfm) | 360 | 360 | 360 |
| Chiller vent stream: | | | |
| concentration (mol % Cl$_2$) | 12.2 | 12.2 | 12.2 |
| flow rate (scfm) | 657 | 657 | 657 |
| Pure chlorine recovery (kg/hr) | 748 | 748 | 748 |
| Membrane area (m$^2$) | 1,304 | 2,504 | 4,008 |

The data show that the thicker the membrane, the lower is the permeation rate, thus the higher is the membrane area required to perform the same separation. The amount of chlorine recovered is the same for all three membrane thicknesses.

EXAMPLE 12

Results of Stability Test of Silicone Rubber Membrane Module

Figure 9:
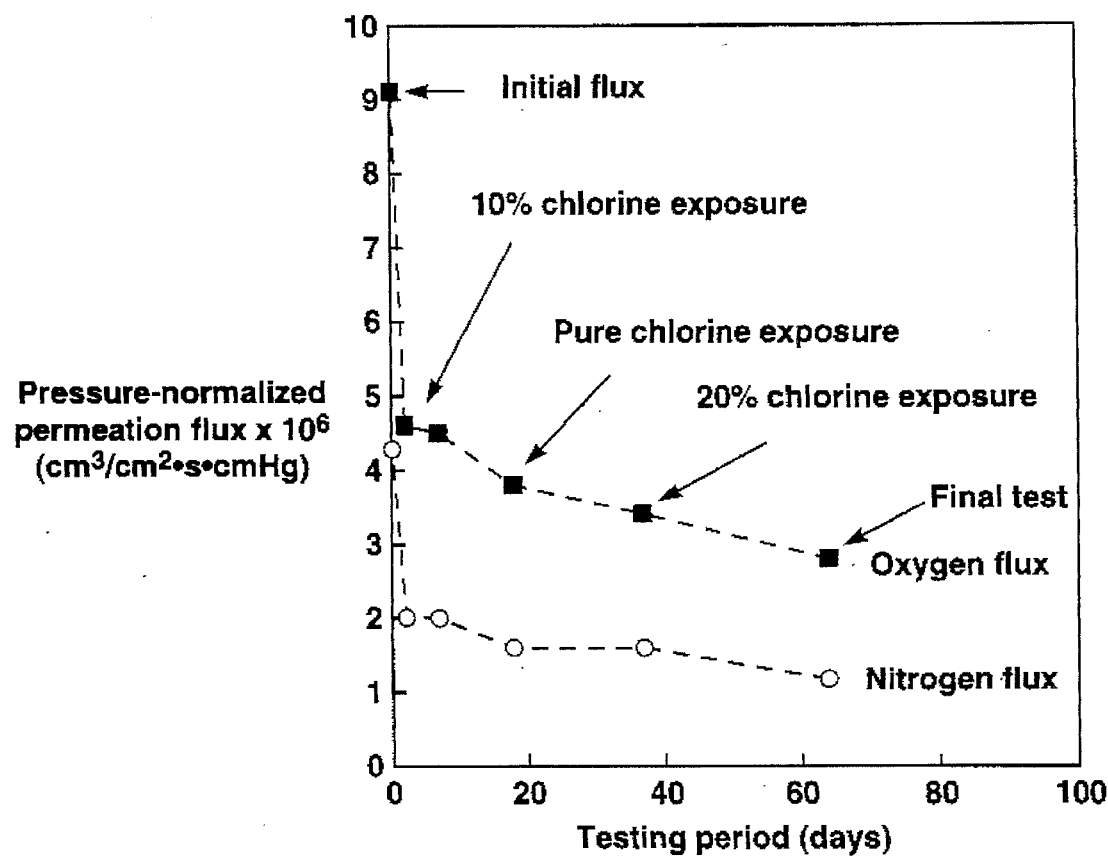
FIG. 9 is a graph showing the changes in the oxygen and nitrogen pressure-normalized fluxes in a membrane module over the test period.

Throughout the test period, and after the tests with chlorine/nitrogen mixtures and with pure chlorine gas were completed, one silicone rubber membrane module was retested with oxygen and nitrogen gases. The permeation fluxes of both oxygen and nitrogen had decreased, but the oxygen/nitrogen selectivity was slightly higher than before exposure to chlorine. FIG. 9 shows the nitrogen pressure-normalized flux as a function of time over the complete module evaluation test period. The oxygen and nitrogen pressure-normalized fluxes, and the oxygen/nitrogen selectivity of the module are shown in Table 13. These oxygen/nitrogen selectivities indicate that the module was in good condition after exposure to chlorine during the tests.

TABLE 13

| Chlorine Concentration in Test (%) | Day of Test (days after start of test period) | Cumulative Days of Testing (days) | Pressure-Normalized Flux × 10$^6$ (cm$^3$/cm$^2$ · s · cmHg) | | Oxygen/ Nitrogen Selectivity (—) |
|---|---|---|---|---|---|
| | | | Oxygen | Nitrogen | |
| <1* | 0 | 0 | 9.1 | 4.3 | 2.1 |
| 10 | 2 | 2 | 4.6 | 2.0 | 2.3 |
| 10 | 5 | 7 | 4.5 | 2.0 | 2.3 |
| 100 | 11 | 18 | 3.8 | 1.6 | 2.4 |
| 20 | 19 | 37 | 3.4 | 1.6 | 2.2 |
| <1** | 27 | 64 | 2.8 | 1.2 | 2.3 |

*module and housing were contaminated with chlorine.
**housing contaminated with chlorine.

We claim:

1. A process for removing chlorine from a chlorine-containing gas stream, comprising:

(a) providing a membrane having a feed side and a permeate side;

(b) passing said chlorine-containing gas stream across said feed side;

(c) maintaining said feed side and said permeate side at different pressures thereby providing a driving force for transmembrane permeation to said permeate side;

(d) withdrawing from said permeate side a permeate stream enriched in chlorine;

(e) withdrawing from said feed side a residue stream depleted of chlorine.

2. The process of claim 1, wherein said membrane is a composite membrane comprising a microporous support layer and a permselective coating layer.

3. The process of claim 2, wherein said permselective coating layer comprises a rubbery polymer.

4. The process of claim 2, wherein said permselective coating layer comprises a crosslinked polymer.

5. The process of claim 2, wherein said permselective coating layer comprises crosslinked silicone rubber.

6. The process of claim 2, wherein said permselective coating layer has a thickness less than 20 µm.

7. The process of claim 1, wherein said membrane has a mixed-gas chlorine/nitrogen selectivity of not less than 10 at operating conditions of the process.

8. The process of claim 1, wherein at least a 3-fold enrichment of chlorine in said permeate stream compared with said chlorine-containing gas stream is obtained.

9. The process of claim 1, wherein at least 90% of said chlorine is removed from said chlorine-containing gas stream.

10. The process of claim 1, wherein at least 99% of said chlorine is removed from said chlorine-containing gas stream.

11. The process of claim 1, wherein said chlorine-containing gas stream contains at least 10% chlorine.

12. The process of claim 1, wherein said chlorine-containing gas stream comprises chlorine in air.

13. The process of claim 1, wherein said chlorine-containing gas stream comprises chlorine in nitrogen.

14. The process of claim 1, wherein said chlorine-containing gas stream comprises at least three components.

15. The process of claim 1, wherein said chlorine-containing gas stream is at a temperature less than 20° C.

16. The process of claim 1, wherein said chlorine-containing gas stream is at a temperature less than 0° C.

17. The process of claim 1, wherein said chlorine-containing gas stream is at a temperature less than −20° C.

18. The process of claim 1, wherein said chlorine-containing gas stream is at a pressure of at least 100 psig.

19. The process of claim 1, wherein said chlorine-containing gas stream is at a pressure of at least 150 psig.

20. The process of claim 1, wherein said chlorine-containing gas stream has been subjected to drying to remove water vapor.

21. The process of claim 1, wherein said chlorine-containing gas stream has been subjected to condensation.

22. The process of claim 1, wherein the chlorine-containing gas stream has been diluted with air.

23. The process of claim 1, wherein said permeate stream is subjected to further treatment.

24. The process of claim 23, wherein said further treatment is condensation.

25. The process of claim 1, wherein said permeate stream contains at least 20% chlorine.

26. The process of claim 1, wherein said residue stream is subjected to further treatment.

27. The process of claim 26, wherein said further treatment is scrubbing.

28. The process of claim 26 wherein said further treatment is adsorption.

29. The process of claim 1, wherein said residue stream contains less than 1% chlorine.

30. The process of claim 1, wherein said residue stream contains less than 100 ppm chlorine.

31. The process of claim 1, wherein said residue stream contains less than 10 ppm chlorine.

32. A process for removing chlorine from a chlorine-containing gas stream, comprising:
 (a) providing a chlorine-containing gas stream;
 (b) performing a condensation step to condense at least a portion of said chlorine-containing gas stream;
 (c) withdrawing a condensed stream comprising chlorine in liquid form;
 (d) withdrawing a non-condensed stream depleted of chlorine compared with said chlorine-containing gas stream;
 (e) performing a membrane separation step, comprising:
  providing a membrane having a feed side and a permeate side;
  passing said non-condensed stream from said condensation step across said feed side;
  maintaining said feed side and said permeate side at different pressures thereby providing a driving force for transmembrane permeation to said permeate side;
  withdrawing from said permeate side a permeate stream enriched in chlorine compared with said non-condensed stream;
  withdrawing from said feed side a residue stream depleted of chlorine;
 (f) recycling said permeate stream to said condensation step.

33. The process of claim 32, wherein said membrane comprises crosslinked silicone rubber.

34. The process of claim 32, wherein said membrane comprises a permselective layer less than 20 μm thick.

35. The process of claim 32, wherein said membrane has a chlorine/nitrogen selectivity of not less than 10 at operating conditions of the process.

36. The process of claim 32, wherein at least 90% of said chlorine is removed from said chlorine-containing gas stream.

37. The process of claim 32, wherein said chlorine-containing gas stream is at a temperature less than −10° C.

38. The process of claim 32, wherein said chlorine-containing gas stream is at a pressure of at least 100 psig.

39. The process of claim 32, wherein said permeate stream contains at least 20% chlorine.

40. The process of claim 32, wherein said residue stream contains less than 1% chlorine.

41. A chlorine-production process, comprising:
 (1) carrying out an electrolysis step, thereby producing raw chlorine gas;
 (2) subjecting said raw chlorine gas to one or more processing steps; and
 (3) subjecting at least a portion of any chlorine-containing gas remaining after said processing steps to a chlorine-separating process, said chlorine-separating process comprising:
  (a) providing a membrane having a feed side and a permeate side;
  (b) passing said chlorine-containing gas across said feed side;
  (c) maintaining said feed side and said permeate side at different pressures thereby providing a driving force for transmembrane permeation to said permeate side;
  (d) withdrawing from said permeate side a permeate stream enriched in chlorine;
  (e) withdrawing from said feed side a residue stream depleted of chlorine.

42. The process of claim 41, wherein said one or more processing steps include chilling.

43. The process of claim 41, wherein said one or more processing steps include compression.

44. The process of claim 41, wherein said one or more processing steps include absorption.

45. The process of claim 41, wherein said one or more processing steps include drying.

46. A process for removing chlorine from a chlorine-containing gas stream, comprising:
 (a) providing a first membrane having a first feed side and a first permeate side;
 (b) passing said chlorine-containing gas stream across said first feed side;
 (c) maintaining said first feed side and said first permeate side at different pressures thereby providing a driving force for transmembrane permeation to said first permeate side;
 (d) withdrawing from said first permeate side a first permeate stream enriched in chlorine;
 (e) withdrawing from said first feed side a first residue stream depleted of chlorine;
 (f) providing a second membrane having a second feed side and a second permeate side;
 (g) passing said first permeate stream from said first membrane across said second feed side of said second membrane;
 (h) maintaining said second feed side and said second permeate side at different pressures thereby providing a driving force for transmembrane permeation to said second permeate side;
 (i) withdrawing from said second permeate side of said second membrane a second permeate stream enriched in chlorine compared with said first permeate stream;
 (j) withdrawing from said second feed side of said second membrane a second residue stream depleted in chlorine compared with said first permeate stream.

47. A process for removing chlorine from a chlorine-containing gas stream, comprising:
 (a) providing a first membrane having a first feed side and a first permeate side;
 (b) passing said chlorine-containing gas stream across said first feed side;

(c) maintaining said first feed side and said first permeate side at different pressures thereby providing a driving force for transmembrane permeation to said first permeate side;

(d) withdrawing from said first permeate side a first permeate stream enriched in chlorine;

(e) withdrawing from said first feed side a first residue stream depleted of chlorine;

(f) providing a second membrane having a second feed side and a second permeate side;

(g) passing said first residue stream from said first membrane across said second feed side of said second membrane;

(h) maintaining said second feed side and said second permeate side at different pressures thereby providing a driving force for transmembrane permeation to said second permeate side;

(i) withdrawing from said second permeate side of said second membrane a second permeate stream enriched in chlorine compared with said first residue stream;

(j) withdrawing from said second feed side of said second membrane a second residue stream depleted in chlorine compared with said first residue stream.

* * * * *